(12) United States Patent
Shooter

(10) Patent No.: US 10,899,369 B2
(45) Date of Patent: Jan. 26, 2021

(54) ELECTRIC RAIL CARRIAGE

(71) Applicant: Vivarail Ltd., Warwickshire (GB)

(72) Inventor: Adrian Shooter, Oxfordshire (GB)

(73) Assignee: Vivarail Ltd., Warwickshire (GB)

( * ) Notice: Subject to any disclaimer, the term of this patent is extended or adjusted under 35 U.S.C. 154(b) by 335 days.

(21) Appl. No.: 15/751,768

(22) PCT Filed: Aug. 11, 2016

(86) PCT No.: PCT/GB2016/052494
§ 371 (c)(1),
(2) Date: Feb. 9, 2018

(87) PCT Pub. No.: WO2017/025751
PCT Pub. Date: Feb. 16, 2017

(65) Prior Publication Data
US 2018/0237037 A1   Aug. 23, 2018

(30) Foreign Application Priority Data

Aug. 11, 2015 (GB) .................................. 1514204.5
Apr. 18, 2016 (GB) .................................. 1606757.1

(51) Int. Cl.
*B61C 17/06* (2006.01)
*B61C 3/00* (2006.01)
(Continued)

(52) U.S. Cl.
CPC ................ *B61C 17/06* (2013.01); *B61C 3/00* (2013.01); *B61F 1/00* (2013.01); *H01M 2/1083* (2013.01);
(Continued)

(58) Field of Classification Search
CPC ... B61C 3/00; B61C 3/02; B61C 17/06; B61F 1/00; H01M 2/10
See application file for complete search history.

(56) References Cited

U.S. PATENT DOCUMENTS 3,906,866 A * 9/1975 Knippel .................... B61B 5/02
104/139
2001/0052433 A1  12/2001 Harris et al.
(Continued)

FOREIGN PATENT DOCUMENTS

DE   9110143 U1   10/1991
DE   29620865 U1   2/1997
(Continued)

OTHER PUBLICATIONS

International Search Report of International Application No. PCT/GB2016/052494, dated Nov. 15, 2016, 4 pgs.
(Continued)

*Primary Examiner* — Jason C Smith
(74) *Attorney, Agent, or Firm* — Moyles IP, LLC

(57) ABSTRACT

An electric rail carriage is described. The electric rail carriage may include a train carriage. The train carriage may be arranged to be powered by at least one power module, which is arranged to generate electric power. The carriage may include a main chassis, and at least one power module bay located underneath the main chassis. A power module can be removably located and secured within the power module bay, such that the power module is supported underneath the main chassis. A method of installing the power module into a power module bay is described.

20 Claims, 12 Drawing Sheets

(51) Int. Cl.
  *H01M 2/10* (2006.01)
  *B61F 1/00* (2006.01)
(52) U.S. Cl.
  CPC ...... *B60L 2200/26* (2013.01); *H01M 2220/20* (2013.01); *H01M 2250/20* (2013.01); *Y02T 30/00* (2013.01); *Y02T 90/40* (2013.01)

(56) References Cited

U.S. PATENT DOCUMENTS

| | | | | |
|---|---|---|---|---|
| 2004/0157117 | A1* | 8/2004 | Tamaki | B61C 17/06 429/99 |
| 2006/0144887 | A1* | 7/2006 | Czernietzki | H01M 10/48 429/100 |
| 2010/0212539 | A1* | 8/2010 | Iden | B61C 3/00 105/35 |
| 2011/0234070 | A1* | 9/2011 | Kataoka | B61C 17/00 312/319.1 |
| 2014/0318410 | A1* | 10/2014 | Kral | B60R 16/02 105/50 |
| 2016/0082850 | A1* | 3/2016 | Yamasaki | B60W 10/08 290/3 |
| 2017/0237372 | A1* | 8/2017 | Jalla | B60L 50/15 318/149 |
| 2018/0237037 | A1* | 8/2018 | Shooter | B61F 1/00 |

FOREIGN PATENT DOCUMENTS

| | | |
|---|---|---|
| DE | 102011115570 A1 | 4/2013 |
| EP | 1186497 A1 | 3/2002 |
| EP | 1675197 A1 | 6/2006 |
| EP | 2277761 A2 | 1/2011 |
| KR | 101020406 B1 | 3/2011 |
| KR | 20120109723 A | 10/2012 |
| KR | 20130056494 A | 5/2013 |
| WO | WO-2012095596 A1 * | 7/2012 ............ B61C 17/06 |

OTHER PUBLICATIONS

Written Opinion of International App. No. PCT/GB2016/052494, dated Nov. 15, 2016, 5 pgs.
GB Intellectual Property Office, Search Report of GB Application No. GB1606757.1, which is in the same family as PCT/GB2016/052494, dated Sep. 26, 2016, 5 pgs.
Australian Government, Examination Report for App. No. 2016305563, dated Feb. 28, 2020, which is in the same family as U.S. Appl. No. 15/751,768, 7 pgs.

* cited by examiner

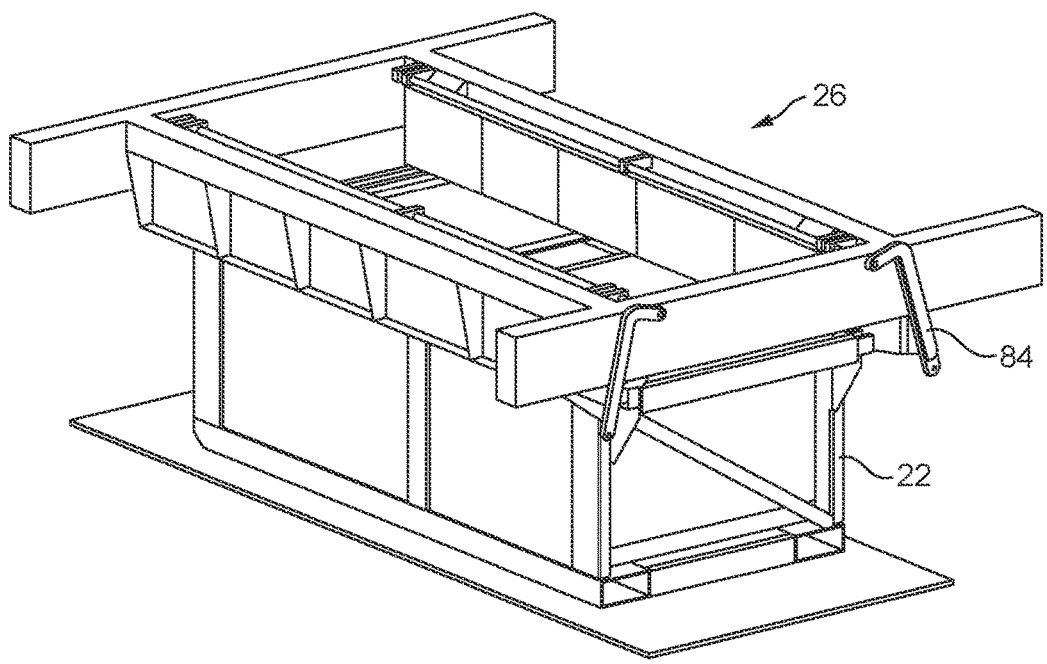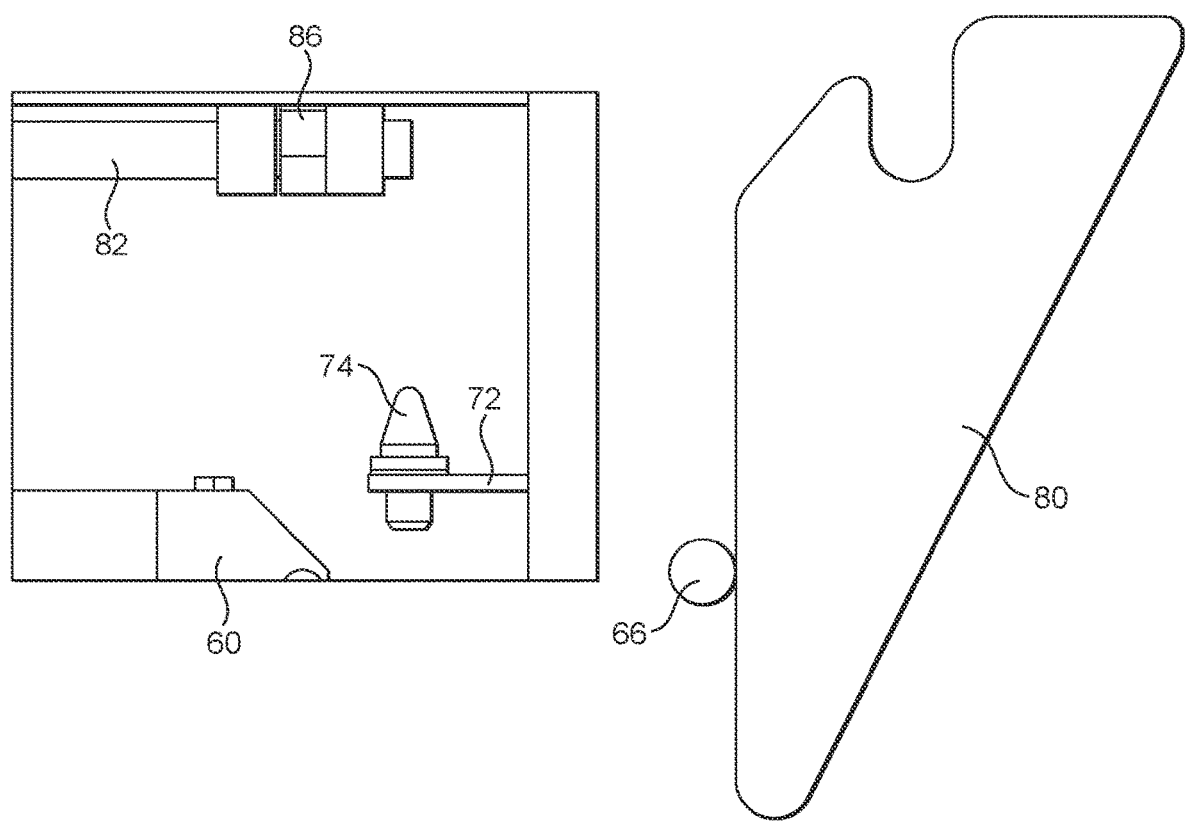
FIG. 8

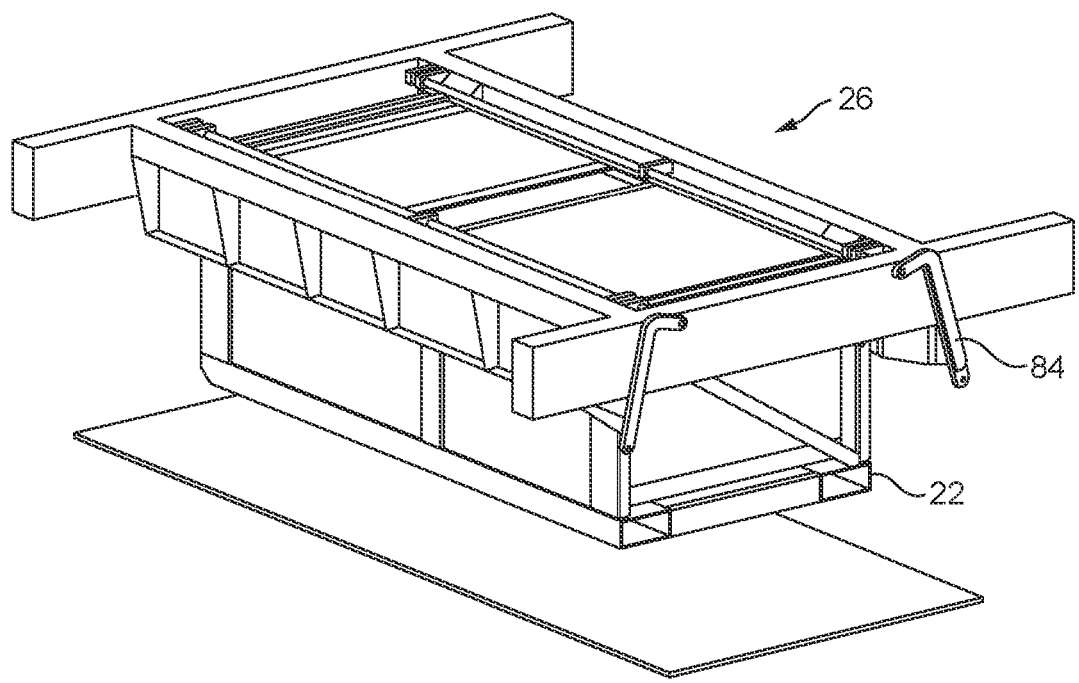
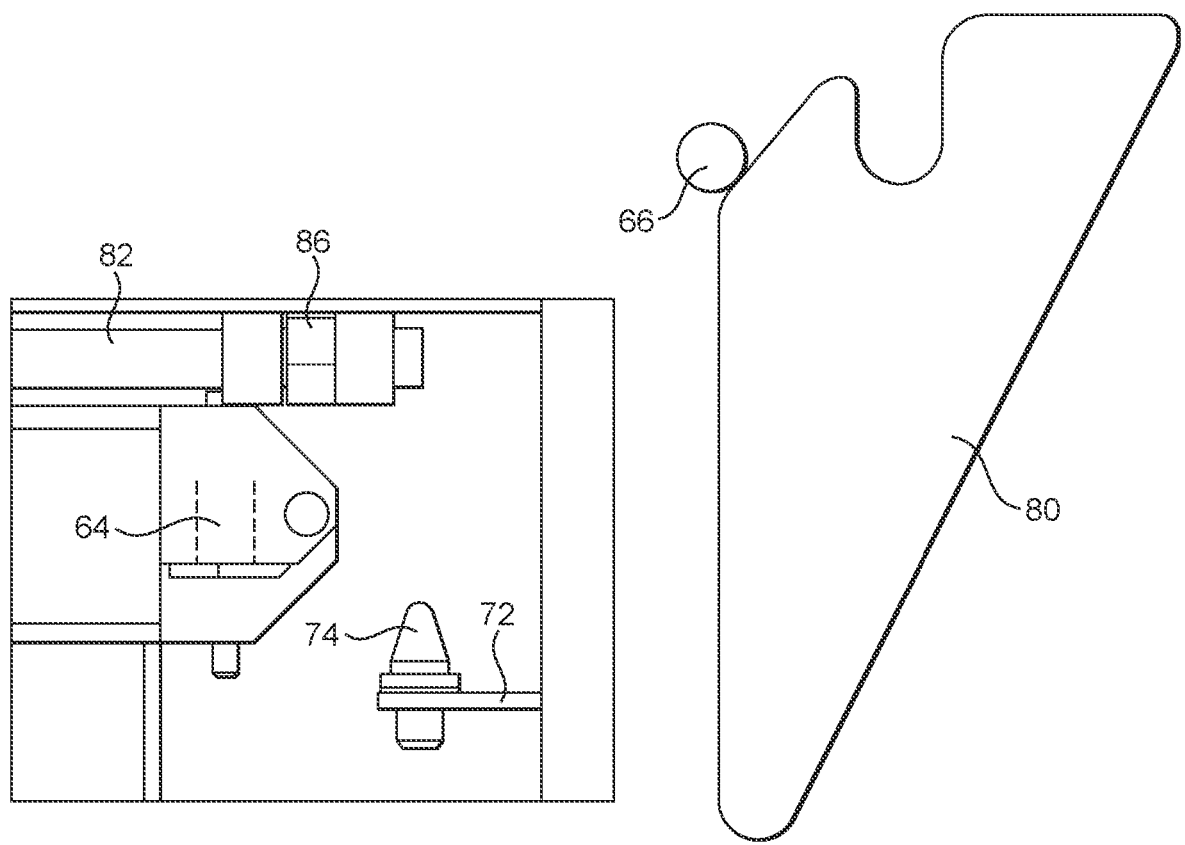
FIG. 9

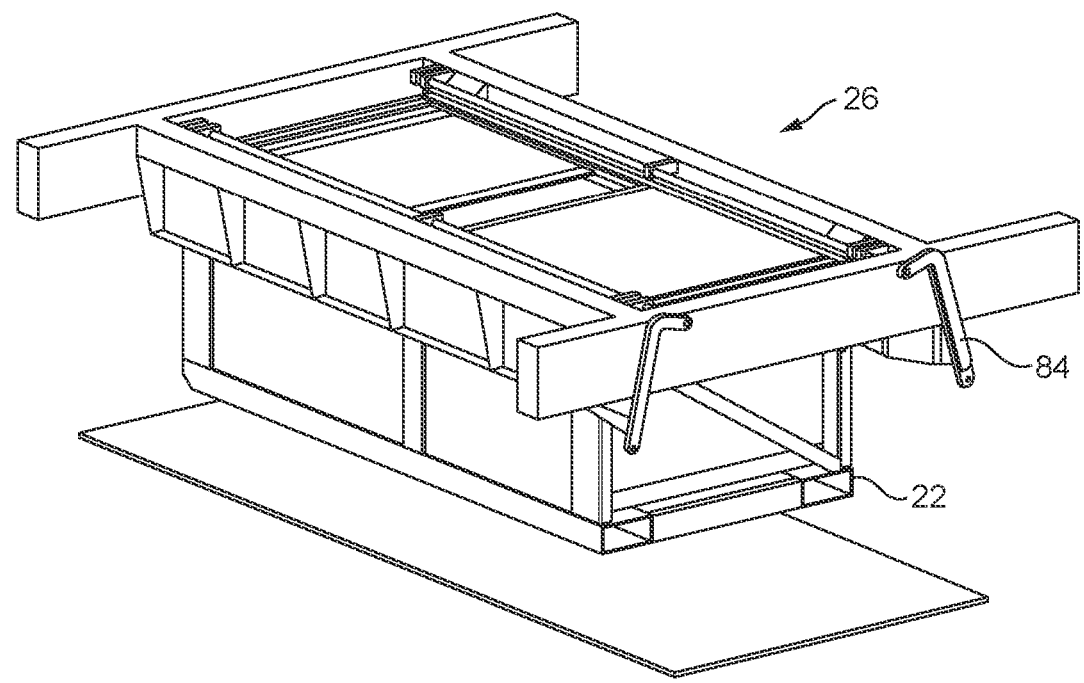
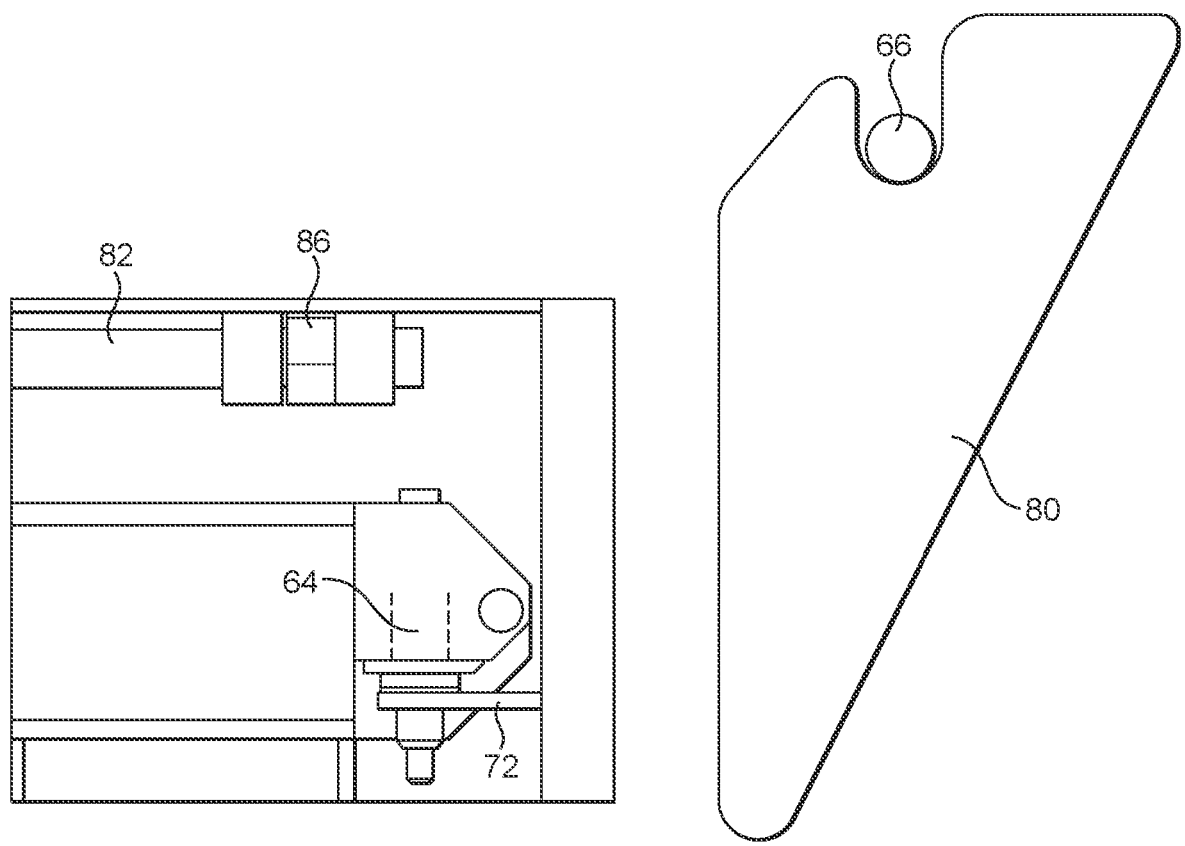
FIG. 11

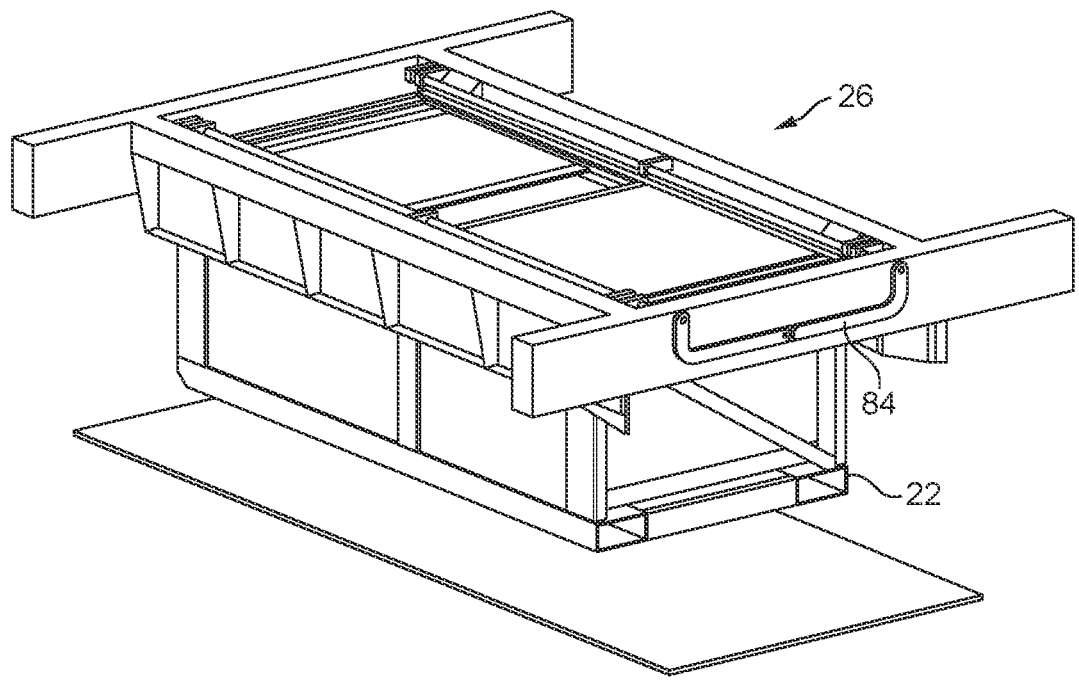
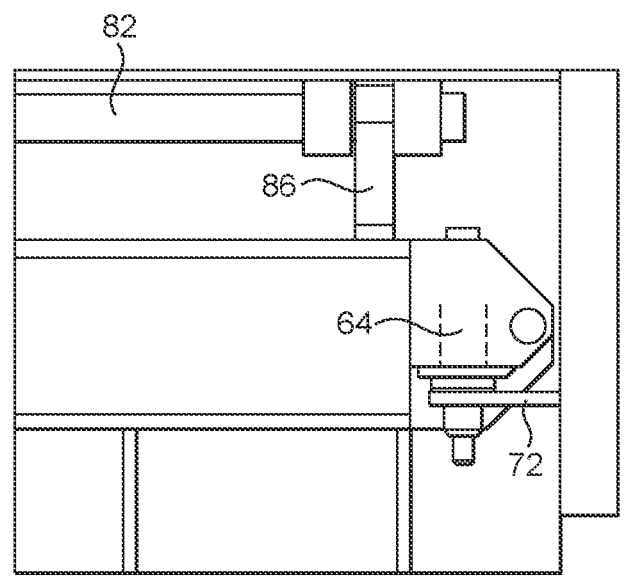
FIG. 12

ELECTRIC RAIL CARRIAGE

CROSS-REFERENCE TO RELATED APPLICATIONS

This application claims priority to PCT/GB2016/052494 filed Aug. 11, 2016, which claims priority to GB1514204.5 filed Aug. 11, 2015 and GB1606757.1 filed Apr. 18, 2016, each of which is incorporated herein by reference in its entirety.

FIELD OF THE DISCLOSURE

The invention relates to an electric rail carriage, in particular, although not exclusively, to an electric train carriage. The invention also relates to a power module for an electric rail carriage, and a method of installing power module in an electric rail carriage.

BACKGROUND OF THE DISCLOSURE

Trains typically comprise a number of train carriages coupled end-to-end. A train may be powered by an on-board engine (e.g. a diesel engine), or by electric motors receiving power from overhead electric cables or an electrified line, for example. The term "multiple unit" is sometimes used to refer to a train having multiple carriages. The self-powered carriages can be coupled together, sometimes together with non-powered carriages, to form a train.

Diesel-electric multiple units (DMEU) are known. In a diesel-electric multiple unit, each powered carriage comprises a single diesel engine which drives an electrical generator which supplies electricity to electric motors which drive the wheels.

In certain circumstances, the engine or the generator may fail due to a mechanical or an electrical fault. If this occurs, then the train may no longer be able to move, and it may have to be towed to a specialist maintenance station where it can be repaired. This is clearly undesirable as it may cause a significant delay to passengers. Further, if the train is operating in a remote location, it may have to be towed a significant distance to the nearest maintenance station. At the maintenance station, the faulty carriage may have to be elevated using specialist lifting equipment so that the engine and/or generator can be repaired or replaced from underneath the carriage. Thus, it may take a significant amount of time to fix a faulty powered carriage.

It is therefore desirable to provide an improved electric rail carriage which may alleviate at least some of these problems to at least some extent.

BRIEF DESCRIPTION OF THE EXEMPLARY EMBODIMENTS

According to an aspect there is provided an electric rail carriage arranged to be powered by at least one power module which is arranged to generate electric power, the carriage comprising: a main chassis; and at least one power module bay located underneath the main chassis and within which a power module can be removably located and secured such that the power module is supported underneath the main chassis. This arrangement may allow a power module can be quickly and easily installed within and removed from a power module bay.

In this specification the term "electric rail carriage" should be understood to mean a rail carriage which is arranged to be driven by an electric motor. Thus, the electric rail carriage comprises an electric motor which can drive the wheels of the carriage. The electric motor may be supplied with power from any suitable source such as a battery, a fuel cell, or an electric generator, for example. A power module arranged to generate electric power may be referred to as an electric power module, regardless of the method used to generate the electric power.

The power module bay may be configured such that a power module can be inserted into the power module bay substantially by movement of the power module in a substantially horizontal direction. To fully install the power module, it may be necessary to lift or lower the power module a small amount. The power module bay may be configured such that a power module can be inserted into the power module bay substantially by movement of the power module in a direction substantially transverse to the longitudinal axis of the carriage. The power module bay may be configured such that a power module can be inserted into the power module bay from the side of the carriage. The carriage and/or the power module bay may be configured so that a power module can be installed and/or removed without lifting the carriage, and without requiring access to the underside of the carriage. This may allow a power module to be installed/removed in remote locations (i.e. not at specialist service stations). For example, it may be possible to remove and/or replace a power module at the side of the rail track using a pallet truck or a fork lift, for example.

The power module bay may comprise a guide for guiding the movement of a power module during insertion into the power module bay. The guide may be arranged to guide the power module in a direction substantially transverse to the longitudinal axis of the carriage. The guide may help to ensure that the power module is inserted into the correct location. The guide may comprise two spaced apart and parallel guide rails. The guide rails may be spaced apart by a distance slightly greater than the width of a power module. The guide rails may extend in a direction substantially perpendicular to the longitudinal axis of the carriage. The guide rails may be attached to the underside of the main chassis.

The power module bay may comprise a stop for limiting the movement of a power module as it is inserted into the power module bay. There may be two stops, one at each side of the power module bay. The or each stop may be located at the rear of the power module bay. For example, when a power module is being inserted into the power module bay, it may come into contact with the stop to prevent it being pushed in too far. The stop may be shaped to guide further movement of the power module during installation. For example, if it is necessary to lift or lower the power module into its final position, the or each stop may guide this lifting or lowering.

The power module bay may comprise at least one support which may be arranged to support a power module located within the power module bay. There may be at least one support at the rear of the power module bay, and at least one support at the front of the power module bay. The at least one support may have an upper surface from which a power module located within the power module bay hangs. The upper surfaces may be spaced away from the underneath of the main chassis. This may allow support members of a power module to cooperate with the supports of the bay so that the power module hangs within the bay.

The power module bay may comprise at least one location feature arranged to cooperate with a corresponding feature provided on a power module to assist in the positioning of the power module within the power module bay. The location feature may comprise a location pin or opening arranged to locate within a corresponding location opening or pin provided in the power module. The location pin may be a conical pin. The or each pin may extend in the vertical direction. Similarly, the or each location opening may have a vertical axis. There may be four location pins, one in each corner region of the power module bay. The or each location feature may be provided on or by the support. For example, there may be four location pins, each extending from a respective support.

The carriage may further comprise a securing mechanism which is operable between a released configuration and a securing configuration in which it secures a power module within the power module bay. In the released configuration it may be possible to remove a power module from the bay, or insert a power module into the bay. The securing mechanism may comprise at least one clamping element which, with the securing mechanism in the securing configuration, acts against a part of the power module. There may be four clamping elements, one in each corner of the power module bay. The or each clamping element may be rotatable between at least a released position and a securing position in which it acts against a part of the power module. The or each clamping element may be arranged to clamp a part of the power module against a support. There may be two clamping elements on one side of the bay, and two clamping elements on the other side of the bay. There may be two rotatable actuation rods, one on each side of the bay, with a front and rear clamping element attached to each rod. Each rod may be provided with an actuator handle which may be positioned at the front of the power module bay. The actuator handle may be used to rotate the respective rod between a released position and a securing or clamping position. The or each clamping member may be lobe or cam-shaped.

The power module bay may be configured to receive a substantially cuboidal power module. There may be a plurality of power module bays, each for receiving an individual power module. For example, there may be two power module bays.

The carriage may further comprise a plurality of wheels and at least one electric motor for driving at least some of the wheels. The or each electric motor may be arranged to be powered by a power module located within a power module bay.

The carriage may further comprise at least one liquid fuel tank for storing liquid fluid, such as diesel, petrol or another combustible fluid, for supply to at least one power module.

According to another aspect there is provided a power module for an electric rail carriage arranged to be removably located and secured within a power module bay located underneath a main chassis of the electric rail carriage, the power module comprising: a main structural support frame; a liquid fuel engine housed within the main structural support frame; an electric generator housed within the main structural support frame and coupled to the engine by a transmission such that it can be driven by the engine, the electric generator arranged to generate electric power for supplying to an electric motor of the electric rail carriage; a fuel inlet for the engine having a fuel coupling to which a fuel line can be detachably coupled; and an electric outlet having an electric coupling to which an electric cable can be detachably coupled. It may be possible to quickly and easily install or remove a power module from a power module bay. A new or a replacement power module may be able to be installed quickly and easily. The couplings may be "quick connect" couplings, or may simply be arranged such that the respective lines can be connected and disconnected quickly.

The liquid fuel engine may be a diesel engine a petrol engine, or an engine that runs off any suitable type of fuel.

The power module may further comprise an AC-DC converter housed within the main structural support frame and electrically connected between the electric generator and the electric outlet.

The power module may further comprise an air compressor housed within the main structural support frame and coupled to the engine by a transmission such that it can be driven by the engine; and a compressed air outlet having a compressed air coupling to which a compressed air line can be detachably coupled. The air compressor may generate compressed air for ancillary equipment such as the brakes and doors of the carriage.

The power module may further comprise a rechargeable power supply arranged to be recharged by an alternator which is coupled to the engine by a transmission such that it can be driven by the engine. The power supply, such as a 12 V battery, may be used for starting the power supply.

The power module may further comprise an engine control unit housed within the main structural support frame for controlling the engine; and a control input having a control input coupling to which a control cable can be detachably coupled. The engine control unit may be configured to communicate with the control units of other power modules in order to control the operation of the power module. The control unit may communicate over a CAN bus, for example.

The power module may be configured to be inserted into a power module bay substantially by movement of the power module in a substantially horizontal direction. To fully install the power module, it may be necessary to lift or lower the power module a small amount.

The power module may be configured such that it can be inserted into a power module bay substantially by movement of the power module in a substantially horizontal direction. The power module may be configured such that it can be inserted into a power module bay substantially by movement of the power module in a direction substantially transverse to the longitudinal axis of the carriage. The power module may be configured such that it can be inserted into a power module bay from the side of the carriage. The power module bay may be configured so that a power module can be installed and/or removed without lifting the carriage, and without requiring access to the underside of the carriage. This may allow a power module to be installed/removed in remote locations (i.e. not at specialist service stations). For example, it may be possible to remove and/or replace a power module at the side of the rail track using a pallet truck or a fork lift, for example.

The power module may be configured to cooperate with a guide of the power module bay during insertion into the power module bay so as to guide the movement of a power module. The guide may be in the form of two parallel guide rails, spaced apart by a distance slightly greater than the width of the module. The guide rails may extend in a direction substantially perpendicular to the longitudinal axis of the carriage. The power module may be arranged to slide between the guide rails. The power module may comprise one or more side projections. The one or more side projections may cooperate with the underside of the or each guide rail during horizontal transverse insertion of the power module to prevent it being lifted vertically.

The power module may comprise at least one support member which is arranged to cooperate with a support of the power module bay to support the power module within the power module bay. The or each support member may have a lower surface which is arranged to cooperate with an upper surface of a support of the power module bay such that in use the power module is hung within the power module bay. There may be at least one rear support member and at least one front support member.

The power module may comprise at least one location feature arranged to cooperate with a corresponding feature provided by the power module bay to assist in the positioning of the power module within the power module bay. The location feature may comprise a location opening or pin arranged to be received within a corresponding location pin or opening provided by the power module bay. The or each location feature may be provided on or by a support member. There may be a location feature in each corner of the power module. There may be four location openings. There may be a location opening in each corner region of the power module. The four openings or holes may be located on the corners of an imaginary rectangle when viewed in plan.

The power module may be arranged to be secured within a power module bay by a securing mechanism of the power module bay. The power module may be arranged to be clamped within a power module bay. The main structural support frame may have a bearing surface on which the clamping elements of the securing mechanism can act.

The power module may be substantially cuboidal. The main structural support frame may define a substantially cuboidal power module package. The power module may have a length greater than the width. The power module may be arranged to be inserted into a power module bay in a direction parallel to the length direction and which is perpendicular to the longitudinal axis of the carriage.

According to yet a further aspect there is provided a power module for an electric rail carriage arranged to be removably located and secured within a power module bay located underneath a main chassis of the electric rail carriage, the power module comprising: a main structural support frame housing: a liquid fuel engine; an electric generator coupled to the engine by a transmission, the electric generator arranged to generate electric power for supplying to an electric motor of the electric rail carriage; and an air compressor coupled to the engine by a transmission; at least one support member at each end of the structural support frame, the lower surfaces of the support members being arranged to cooperate with and be clamped against upper surfaces of corresponding supports of the power module bay such that in use the power module is hung and secured within the power module bay; a plurality of location openings each arranged to receive a corresponding vertically extending location pin provided by the power module bay, wherein the location openings are provided in a support member. There may be four location openings, each located in a corner region of the power module. The power module may further comprise: a fuel inlet for the engine having a fuel coupling to which a fuel line can be detachably coupled; an electric outlet having an electric coupling to which an electric cable can be detachably coupled; and a compressed air outlet having a compressed air coupling to which a compressed air line can be detachably coupled. The power module may further comprise a control unit housed within the main structural support frame for controlling the engine; and a control input having a control input coupling to which a control cable can be detachably coupled.

The invention also relates to an electric rail carriage according to any statement herein with a power module in accordance with any statement herein removably located and secured within each power module bay such that each power module is supported underneath the main chassis. There may be two power module bays per carriage, with a power module located and secured within each bay.

The electric rail carriage may be an electric train carriage.

The invention also relates to a train comprising a plurality of electric rail carriages, each in accordance with any statement herein. A train may comprise one or more powered electric train carriages, each in accordance with any statement herein, and one or more non-powered carriages.

According to a further aspect there is provided a method of installing a power module in an electric rail carriage, the electric rail carriage being arranged to be powered by electric power generated by the power module and wherein the electric rail carriage comprises a main chassis and at least one power module bay located underneath the main chassis, the method comprising: inserting a power module into a power module bay from the side of the carriage substantially by moving the power module in a substantially horizontal direction that is substantially transverse to the longitudinal axis of the carriage such that it is removably located within the power module bay and supported underneath the main chassis; and securing the power module within the power module bay.

Horizontal movement of the power module during insertion may be guided by a guide of the power module bay. The guide may comprise two parallel guide rails spaced apart by a distance comparable to the width of the power module. The power module may be slid within the guide rails during insertion.

The power module bay may comprise a stop, and horizontal movement of the power module may be limited by the stop.

The power module bay may comprise at least one support. The power module may be located within the power module bay such that the or each support cooperates with a support of the power module to support the power module within the power module bay.

The power module bay may comprise at least one location feature, and, following insertion of the power module into the power module bay, the power module may be lifted or lowered such that the at least one location feature cooperates with a corresponding feature provided on the power module so as to position the power module within the power module bay. The location feature may comprise a location pin arranged to locate within a corresponding location opening provided in the power module.

The method may further comprise operating a securing mechanism of the power module bay to secure the power module within the power module bay. The securing mechanism may comprise at least one clamping element, and the securing mechanism may be operated such that the clamping element acts against a part of the power module to clamp it within the power module bay. The clamping element may be rotated such that it acts against a part of the power module. The securing mechanism may be operated to clamp a part of the power module against a support.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the accompanying drawings, in which:

FIGS. 7-12 schematically show various steps involved in installing a power module within a power module bay.

DETAILED DESCRIPTION

Figure 1:
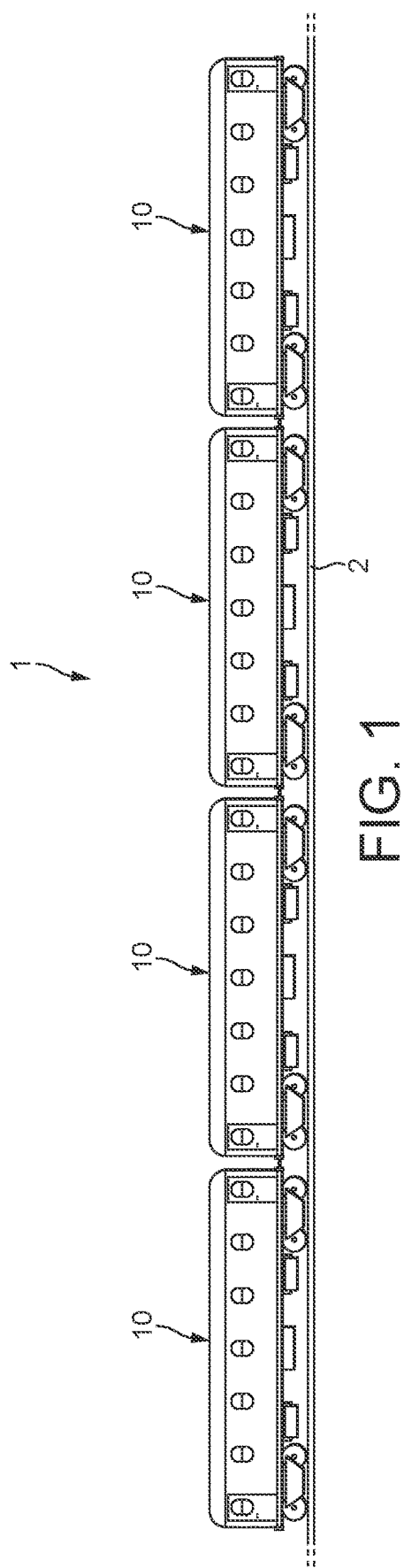
FIG. 1 schematically shows a train comprising a number of carriages.

FIG. 1 shows a four-carriage electric rail train 1, for running on a set of rails 2. The train 1 comprises a plurality of electric train carriages 10, each in the form of a self-propelled train carriage. The train 1 may therefore be referred to as a multiple unit. In this arrangement only two of the four carriages 10 are self-propelled (i.e. powered). However, it should be appreciated that there may be any suitable number of carriages, and any number of them may be self-powered. For example, a train 1 may comprise four carriages, only two of which may be motorized. In this embodiment, the front and rear carriages 10 are provided with a control cab from which the train 1 can be controlled.

The term "electric train carriage" should be understood to mean a train carriage which is arranged to be driven by an electric motor. The electric motor may be supplied with power from any suitable source such as a battery, a fuel cell, or an electric generator, for example.

Figure 2:
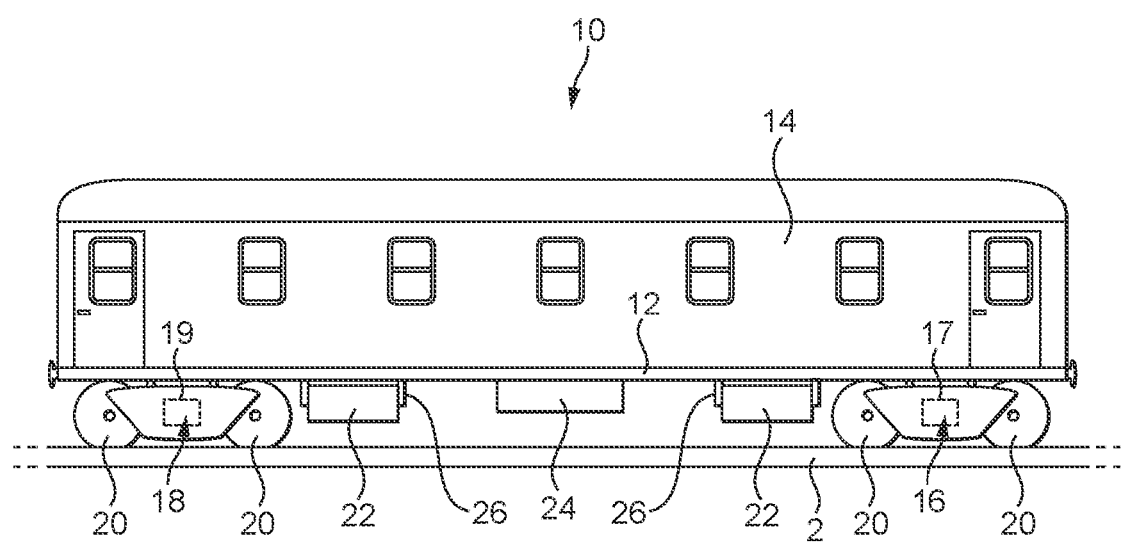
FIG. 2 schematically shows a single powered train carriage.

FIG. 2 shows a single train carriage 10 which may be referred to as a multiple unit. The carriage 10 comprises a main chassis or frame 12 and a carriage body 14 assembled as a monocoque. Mounted to the underneath of the main chassis 12 are front and rear bogies 16, 18, each having four wheels 20. Two electric motors 17, 19 are mounted to each bogie 16, 18 and are arranged to drive the wheels 20 of the respective bogie 16, 18. As will be explained in detail below, the electric motors are arranged to be powered by two on-board electric power modules 22 that are removably attached to the chassis 12 and which are arranged to generate electric power.

Each powered carriage 10 also comprises two power module bays 26, one for each power module 22. The power module bays 26 are attached to the underside of the chassis 12, or are defined by the underneath of the chassis 12, and are configured such that a power module 22 can be removably located and secured therein. With an electric power module 22 located and secured within a power module bay 26, the power module 22 is supported underneath the main chassis 12. An electric power module 22 can be quickly and easily replaced since it is removably located and secured within a power module bay 26. In this embodiment, and as will be described in detail below, an electric power module 22 can be inserted into a power module bay 26 from the side of the carriage 10 by moving the power module 22 in a horizontal direction that is transverse to the longitudinal axis of the carriage 10. A power module 22 can be inserted into and removed from a power module bay 26 without requiring access to the underside of the carriage, and without requiring the carriage to be lifted. This allows a power module 22 of a carriage 10 to be replaced in a remote location, without having to access the underneath of the carriage, which would require either lifting equipment or an inspection pit.

In this embodiment, the train carriage 10 is configured such that it can be powered by a number of different types of compatible and interchangeable electric power modules 22, each type generating electric power utilising a different method. For example, there may be four different types of electric power module 22. A first type of electric power module 22 may comprise a diesel engine arranged to drive an electric generator which generates electric power. A second type of electric power module 22 may comprise a petrol engine arranged to drive an electric generator which generates electric power. A third type of electric power module 22 may comprise one or more batteries arranged to supply electric power. A fourth type of electric power module 22 may comprise a hydrogen fuel cell arranged to generate electric power. Of course, it should be appreciated that other types of electric power module, utilising other methods for generating electric power, could be used. The different types of power module 22 are compatible and interchangeable since they have similar connections and outputs. Further, each type of power module 22 is configured to be removably located within the same power module bay 26.

Figure 3:
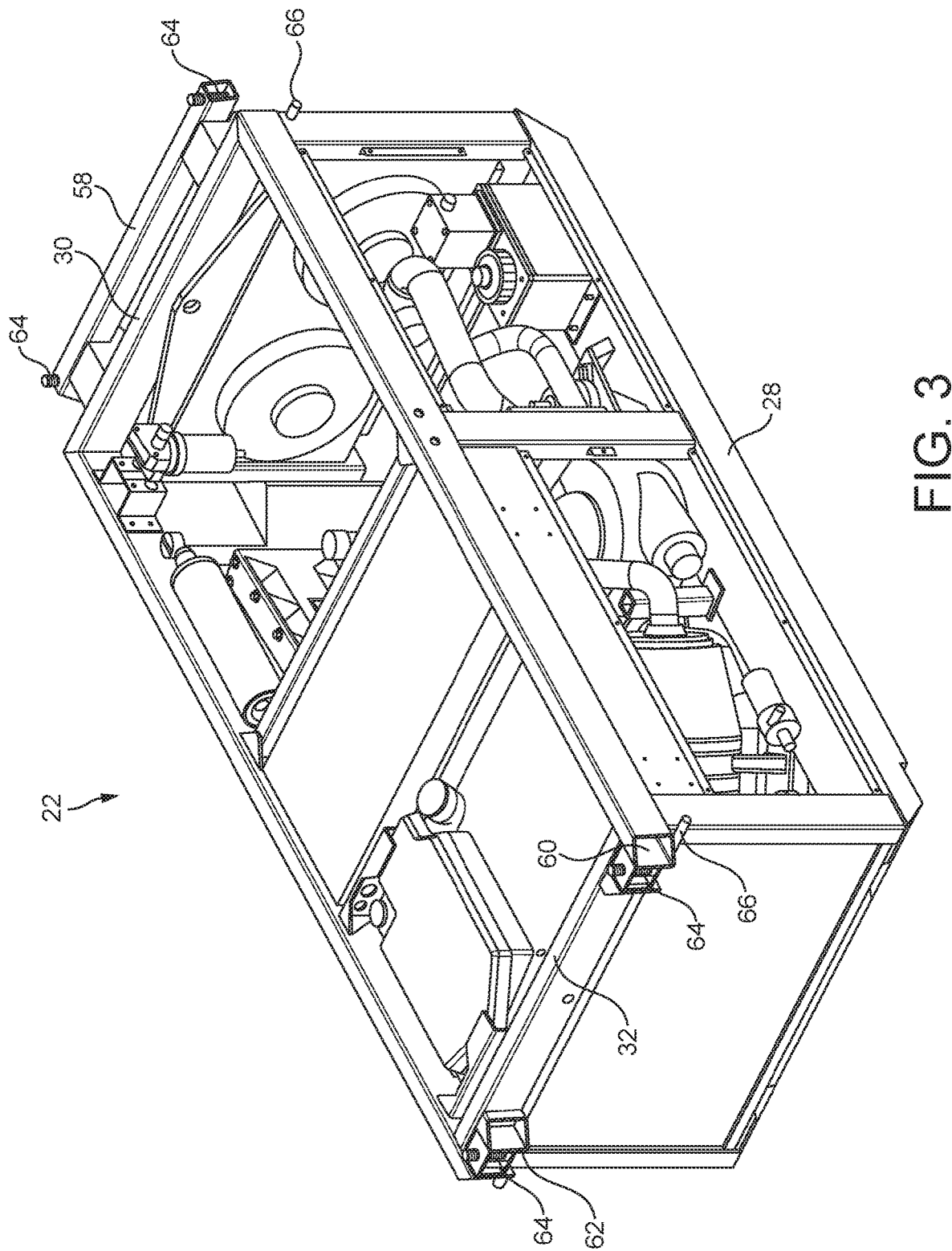
FIG. 3 schematically shows a power module.
Figure 4:
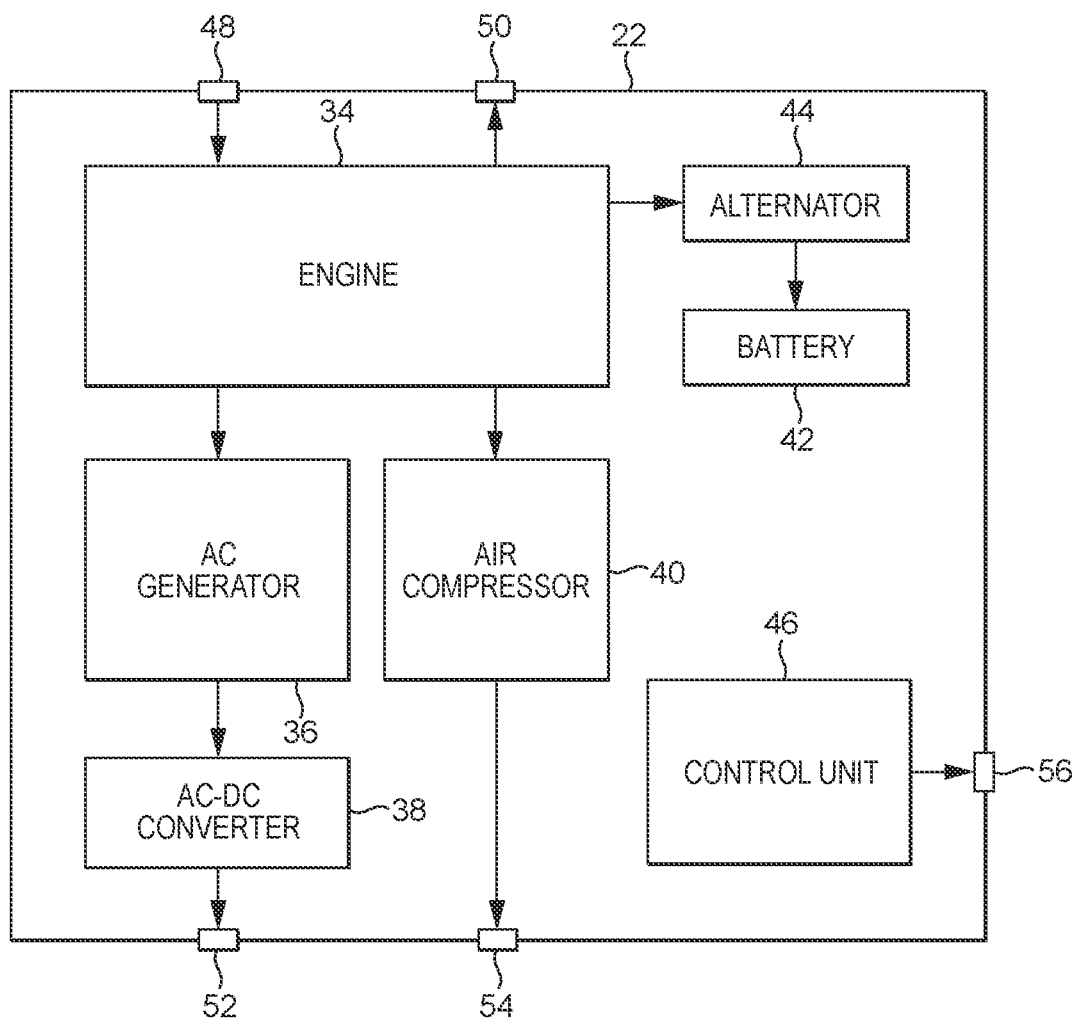
FIG. 4 schematically shows the components and couplings of the power module of FIG. 3.

FIG. 3 shows an individual removable power module 22 which can be located within a power module bay 26. The power module 22 shown in FIG. 3 is a diesel-electric power module 22, but it should be appreciated that other types of power module could be used. The power module 22 is generally cuboidal and comprises a main structural support frame 28 that defines a cuboidal package. In this embodiment, the power module 22 has a front end 30 and a rear end 32 and is of a length that is greater than the width. With reference to FIG. 4, the diesel-electric power module 22 houses a number of components including a 3.2 litre five-cylinder diesel engine 34, an electric generator 36, an AC-DC converter 38, and an air compressor 40. The electric generator 36 is connected to the diesel engine 34 via a transmission such that the engine 36 drives the generator 36. The generator 36 is arranged to generate 3-phase alternating current and its output is connected to the AC-DC converter 38 in order to convert the AC to 750V DC. The air compressor 40 is also connected to the diesel engine 34 via a transmission such that the engine 36 drives the compressor 40 to generate compressed air. The power module 22 also comprises a battery 42 which can be charged by an alternator 44 driven by the engine 34. Further, the power module 22 also comprises a control unit 46 for controlling the operation of the various components in order to deliver the outputs required.

The power module 22 comprises a number of connectors for connecting external components to the power module 22. There is a fuel inlet having a detachable fuel inlet coupling 48 to which a fuel line from a fuel tank 24 can be connected so as to supply fuel to the engine 34. There is a fuel outlet having a detachable fuel outlet coupling 50 to which a return fuel line to the fuel tank 24 can be connected so that surplus fuel can be returned to the fuel tank 24. There is an electric outlet having a detachable electric coupling 52 to which an electric cable can be connected so as to supply electric power from the AC-DC converter 38 to one of the electric motors. There is a compressed air outlet having a detachable compressed air coupling 54 to which an air line can be connected so as to supply compressed air from the compressor 40 to ancillary equipment such as the brakes and carriage doors. There is also a control input having a detachable control input coupling 56 to which a control cable for supplying control signals to control the power module 22 can be attached. The detachable couplings allow the various lines and cables to be quickly and easily connected and disconnected in order to allow a power module 22 to be installed and removed quickly. The fuel coupling 48, 50 and the compressed air coupling 54 are "dry break" couplings which means that a seal is formed when the respective lines are disconnected. There may also be an electrical connector for a safety earth cable. This may be a bolted connection.

The power module 22 comprises a front support member 58 provided at the front end 30 of the support frame 28 and first and second rear support members 60, 62 provided at the rear end 32 of the support frame 28. The front and rear support members 58, 60, 62 have lower support surfaces which, as will be described below, cooperate with upper support surfaces of a power module bay 26 such that the power module 22 hangs within a bay 26. As shown in FIG. 3, the front support member 58, or bar, has a location hole 64 at each end. Similarly, each rear support member 60, 62 has a location hole 64. The location holes 64 are open at the bottom and have vertical axes. In this embodiment, the location holes 64 are in the corner regions of the power module 22 and lie on the corners of an imaginary rectangle (when viewed in plan). As will be described in detail below, these openings 64 cooperate with corresponding location pins of the power module bay 26. The power module 22 also comprises four guide pins 66, one located in each corner of the power module 22. Each pin 66 extends outwards in the width direction (i.e. in a horizontal direction perpendicular to the longitudinal axis of the power module). The pins 66 extend sideways to a position beyond the sides of the main structural support frame 28.

Figure 5:
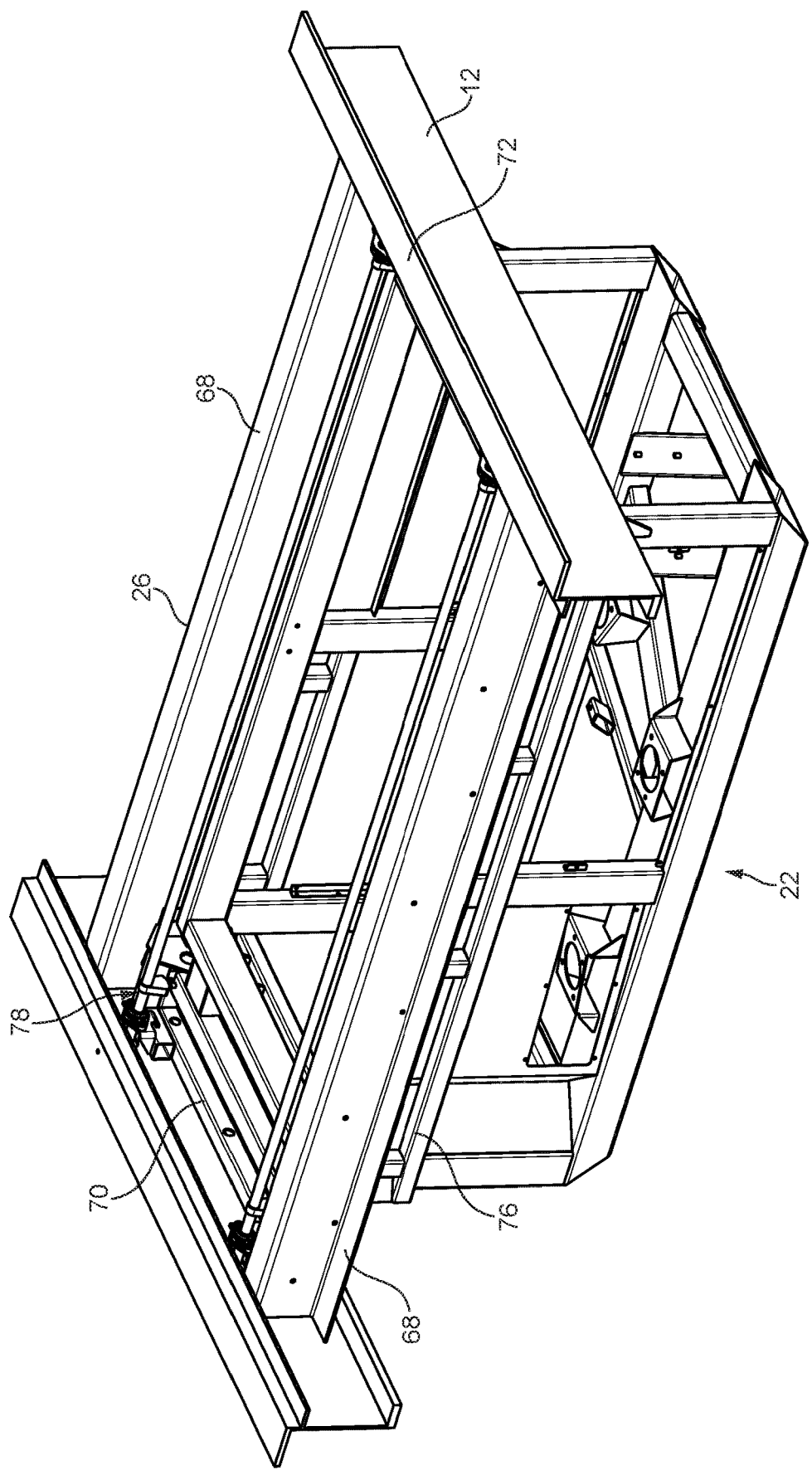
FIG. 5 schematically shows a power module located and secured within a power module bay.
Figure 6:
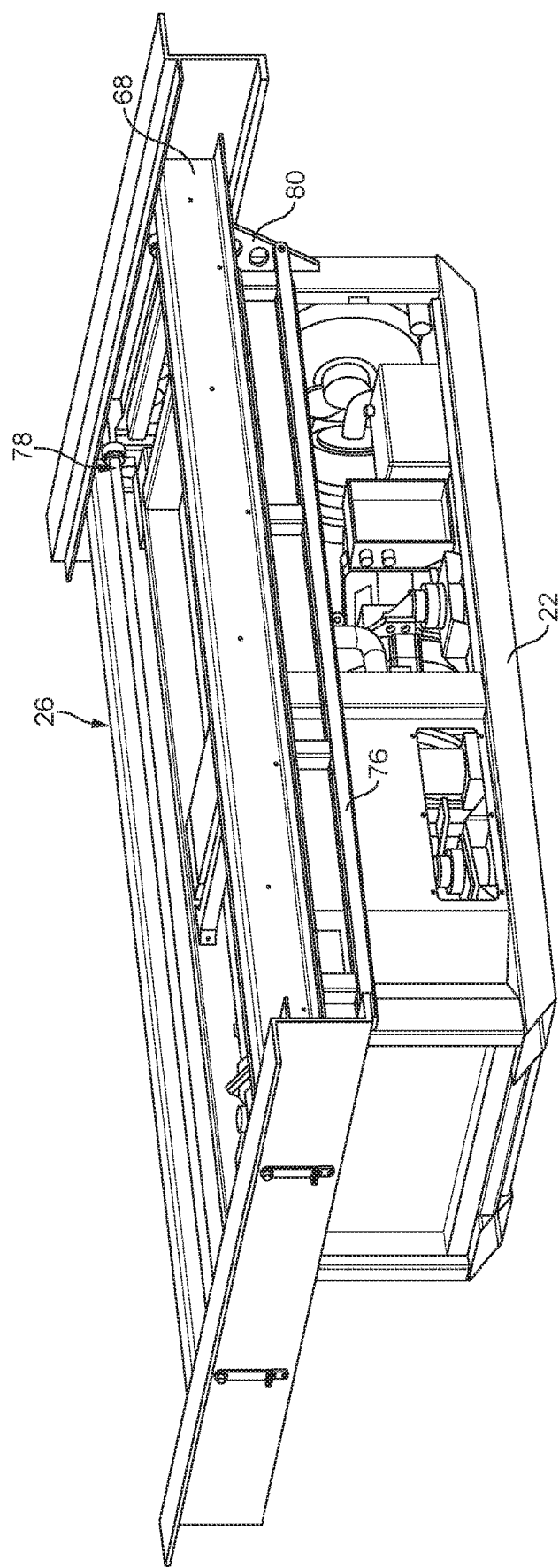
FIG. 6 schematically shows a power module located and secured within a power module bay.

A power module bay 26 with a power module 22 located and secured within it is shown in FIG. 5. The power module 22 shown in FIG. 5 may be the diesel-electric power module 22 of FIGS. 3 and 4, or it may be a different type of power module 22. The power module bay 26 in this embodiment is defined by two parallel side beams 68 that are attached to the underneath of the chassis 12. The beams 68 are spaced apart and extend in a direction perpendicular to the longitudinal axis of the carriage 10. The beams 68 are spaced apart by a distance such that they can accommodate the tangs of a fork lift truck or a pallet truck which can be used to insert a power module 26 into the bay 26. The power module bay 26 comprises front and rear supports 70, 72 having upper support surfaces from which the power module 22 is arranged to hang. As will be described below, the supports 70, 72 are also provided with conical location pins 74 which are arranged to locate within the location holes 64 of the power module 22. There are four location pins 74 that are vertically oriented and which lie on the corners of an imaginary rectangle. The power module bay 26 also comprises two parallel guide rails 76, one attached to each side beam 68. The guide rails 76 extend below the side beams 68 and are spaced apart by a distance slightly greater than the width of the structural support frame 28 of the power module 22, but less that the distance between the ends of the guide pins 66 on opposite sides of the module 22. Referring to FIG. 6, the rear of the power module bay 26 also has two stop plates 80, one each side of the bay 26. The power module bay 26 also has a securing mechanism 78 which will be described in detail below. The securing mechanism 78 has a released configuration in which a power module 22 can be inserted into or removed from the power module bay 26, and a secured configuration in which a power module 22 located with the bay 26 is secured.

The power module 22 described with reference to FIGS. 3 and 4 is a diesel-electric power module 22 comprising a diesel engine 34 which is arranged to drive an electric generator 36 to generate electric power. However, as described above, in this embodiment the train carriage 10 is configured such that it can work with electric power modules 22 of other types. Specifically, power module bays 26 are capable of receiving other types of electric power module 22. This means that a first type of power module 22 (e.g. a diesel-electric power module) can be exchanged for a second type of power module 22 (e.g. a battery power module).

In an embodiment there is also a battery power module which comprises the same structural support frame as the diesel-electric power module described above. The support frame houses a number of components including a plurality of batteries, an air compressor and a control unit. The battery power module has a number of the same couplings as the diesel-electric power module, in particular, the electric outlet coupling, the compressed air coupling and the control input coupling are the same.

In an embodiment there is also a hydrogen fuel cell power module which also comprises the same structural support frame. The support frame houses a number of components including at least one hydrogen fuel cell, an air compressor and a control unit. The hydrogen fuel cell power module has a number of the same couplings as the diesel-electric power module, in particular, the electric outlet coupling, the compressed air coupling and the control input coupling are the same. Further, the power module also comprises a fuel inlet coupling for receiving a supply of hydrogen.

If the train carriage 10 is compatible with a plurality of types of power module then it is possible to select an appropriate type of power module 22 with which to operate the train carriage 10. For example, in certain circumstances it may be appropriate to power the train carriage using a diesel-electric power module 22, yet in other circumstances it may be appropriate to power the train carriage using a battery powered module 22. Since the power modules are compatible, it is possible to remove a first type of power module (e.g. a diesel-electric power module) and replace it with a second type of power module (e.g. a battery power module). Although three different types of power module have been described, it should be appreciated that other types of compatible power module could be used.

The operation of inserting a power module 22 into a power module bay 26 will now be described with reference to FIGS. 7-12. A power module 22 can be quickly inserted into a power module bay 26 from the side of the carriage 10 without having to lift the carriage 10 and without requiring access to the underneath of the carriage 10 by using standard equipment such as a fork lift truck or a pallet truck.

Figure 7:
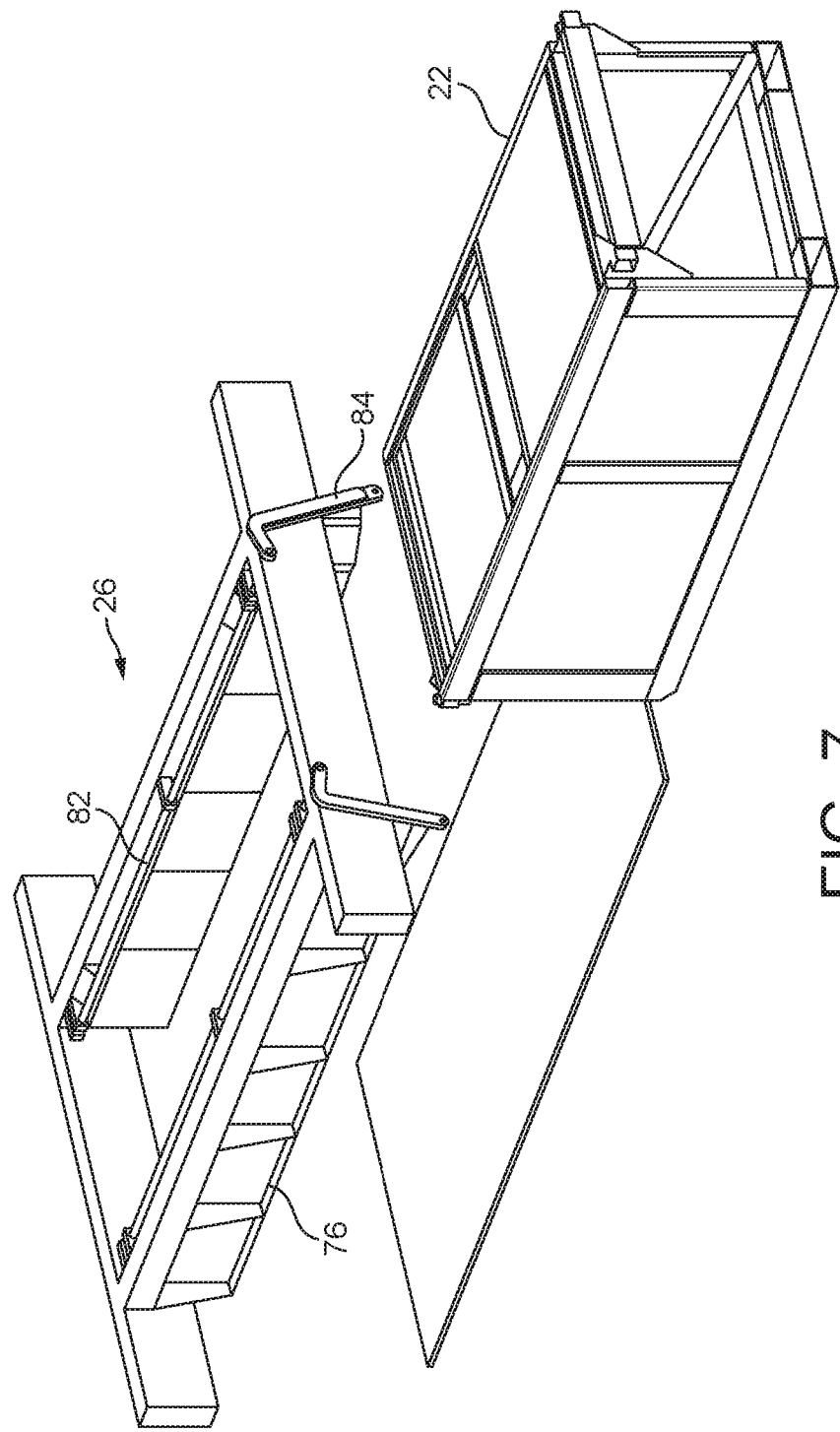

Referring to FIG. 7, to insert a power module 22, the securing mechanism 78 is moved to a released configuration. The securing mechanism 78 comprises two parallel rods 82 that are spaced apart and extend in a direction perpendicular to the longitudinal axis of the carriage 10. The rods 82 are rotatable and each is provided with an actuator handle 84 that is located at the front of the power module bay 26 so that it can be easily accessed by an operator. The actuator handles 84 also provide a visual indication to the operator as to whether the securing mechanism 78 is in the released (FIGS. 7-11) or the securing configuration (FIG. 12). Mounted to each rod 82 are two lobed-shaped clamping members 86 that are eccentrically mounted. In the released configuration the clamping members 86 are in an angular position in which the longest dimension is in the horizontal direction. The power module 22 is then aligned with the power module bay 26 such that the central longitudinal axis of the module 22 is parallel to and located between the guide rails 78.

The power module 22 is then moved in a horizontal direction that is substantially transverse (i.e. perpendicular) to the longitudinal axis of the carriage 10. The upper region of the structural support frame 28 is located between the guide rails 78, with the guide pins 66 located on the lower edge of the guide rails 78. The guide rails 78 and guide pins 66 prevent the power module 22 from being moved vertically, whilst the cooperation between the frame 28 and the guide rails 78 ensures that the module 22 is moved in a transverse direction as it is pushed into the bay 26.

Figure 10:
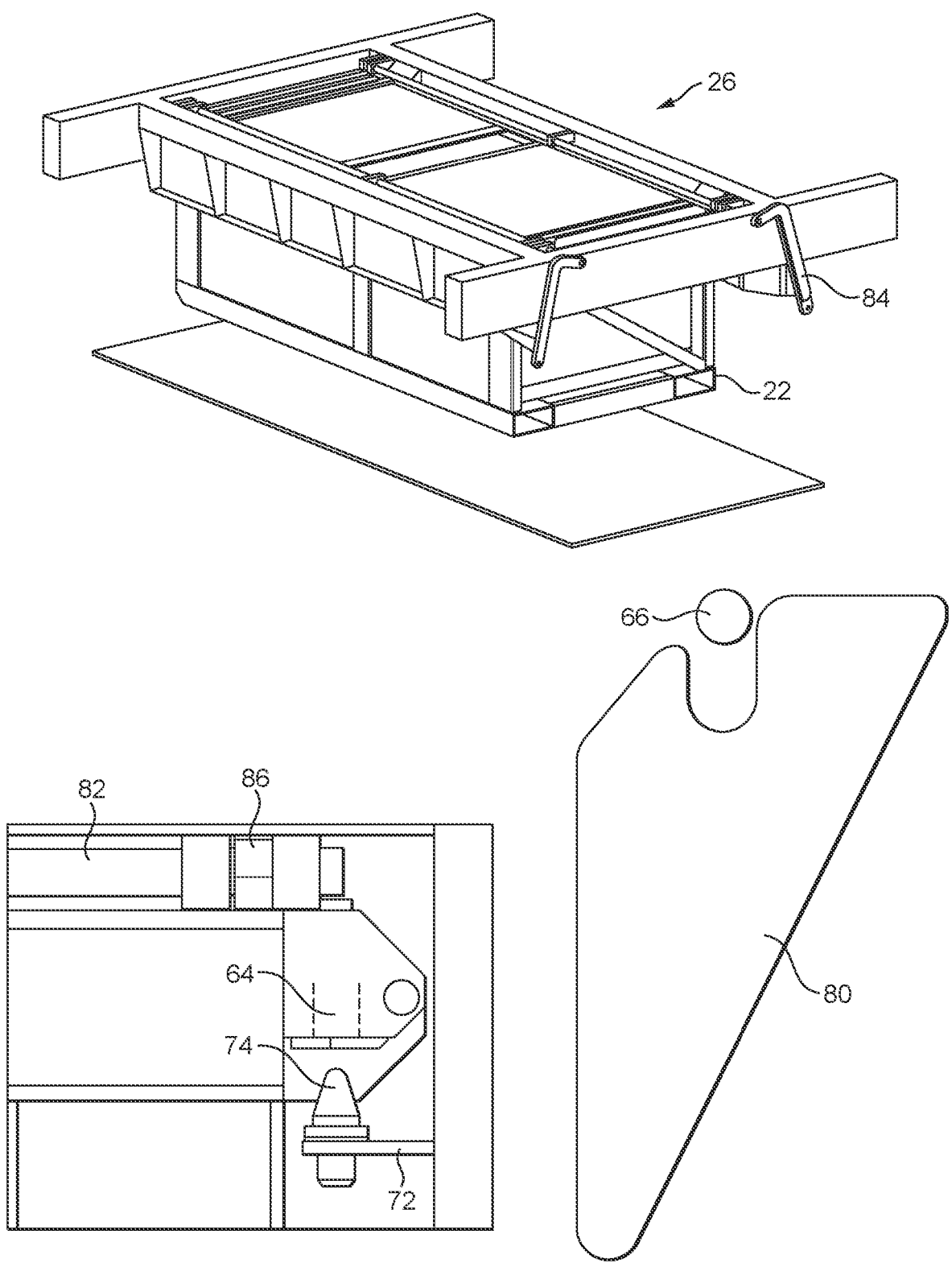

The power module 22 is inserted into the power module bay 26 by pushing it horizontally as far back as it will go. As shown in FIG. 8, the horizontal movement of the power module 22 is halted as the rear guide pins 66 come into contact with the stop plates 80 beyond the guide rails 76. Referring to FIG. 9, the power module 22 is then lifted upwards, and the upwards movement is guided by the cooperation of the guide pins 66 and the stop plates 80. The power module 22 is then pushed back further, again guided by the shape of the stop plates 80 (FIG. 10). In this position, the location holes 64 of the power module 22 are aligned over the conical location pins 74 which vertically extend from the upper surface of the supports 70, 72. The power module 22 is then lowered so that the conical location pins 74 locate within the location holes 64 (FIG. 11). This ensures correct positioning of the power module 22. In this position, the lower surfaces of the support members 58, 60, 62 of the power module 22 cooperate with the upper surfaces of the supports 70, 72 of the power module bay 26 to support the power module 22 in the bay 26 so that it hangs within the bay 26. The power module 22 is therefore hooked into the power module bay 26, as opposed to being bolted or fixed to the underside of the chassis 12. As shown in FIG. 12, the securing mechanism 78 is then moved to a secured configuration by moving the actuator handles 84. This causes the rods 82 and the clamping members 86 to rotate. Since the clamping members 86 are lobed-shaped, as they are rotated through 90 degrees they come into contact with an upper portion of the power module 22, clamping the power module 22 against the supports 70, 72. This quickly and easily secures the power module 22 within the bay 26.

In the case of the diesel-electric power module 22 of FIGS. 3 and 4, once the two power modules 22 have been installed, the couplings of each power module 22 are connected to the diesel fuel tank 24, an electric motor 17, 19, a compressed air system of the carriage, and the control system for operating the train. The control units 46 of the four power modules 22 of the two powered carriages 10 are in communication with one another through the control system (in this embodiment it comprises a CAN bus). Thus, the four power modules 22 can work together to control the power modules 22 to supply the correct amount of power based on the operating conditions of the train 1. Specifically, the operator controls the train using a lever, and the control units 46 communicate to operate the power modules 22 to supply the necessary power. For example, if the train is travelling up an incline, both power modules 22 may supply electric power to all four electric motors 17, 19 of the respective carriage. However, if the train is travelling downhill, or simply coasting or decelerating, then one or more power modules 22 may be turned-off, with at least one power module 22 being operated to generate compressed air for the brakes and doors.

If a power module 22 requires replacing (for example if the engine 34 is not functioning correctly), then the train 1 can operate using only three (or possibly two) power modules 22. This improves the reliability of the train 1. Further, the faulty power module 22 can be quickly and easily replaced in situ (i.e. without having to return to a maintenance station) and without requiring any lifting equipment or an inspection pit. This may be particularly beneficial if the train is operating on a branch line without a maintenance station. It is also possible to replace the power module without having to overhaul the entire train carriage. The faulty module 22 can be quickly removed from the side of the train 1 using standard equipment, such as a fork lift truck or a pallet truck, by performing the reverse of the process described above. Once removed, a new power module 22 can be inserted quickly and with ease and the train 1 can then operate with four power modules 22 again. A power module 22 can be removed and replaced with a new power module 22 from access to only the side of the carriage 10, using a fork lift truck or a pallet truck or similar. The entire removal and replacement operation can be performed quickly, for example around 10 minutes. Further, it is not necessary to use any specialist tools to remove and replace a module 22. As such, it may be possible to a replacement to be carried out by a worker without any highly specialised skills.

If a removed power module is faulty then it may be possible to repair or recondition the power module. For example, in the case of a diesel-electric power module with a faulty engine, the diesel engine could be replaced and the other components could be checked for any faults and replaced/repaired as required. The repaired/reconditioned power module could then be used on either the same train carriage or on another train carriage.

It should be appreciated that although it has been described that the power modules are for an electric rail train carriage having one or more power module bays, the invention could be used with any electric rail carriage such as a tram carriage.

The invention claimed is:

1. An electric rail carriage power system for use with an electric rail carriage, comprising:
   a power module bay located only underneath a main chassis of the electric rail carriage;
   a plurality of wheels;
   an electric motor for driving at least one of the plurality of wheels;
   a plurality of different types of interchangeable power modules, each interchangeable power module of the plurality of different types of interchangeable power modules being configured to generate electric power to power the electric motor;
   an arrangement for supplying the electric power to the electric motor;
   a rechargeable power supply removably located and secured within the power module bay, wherein
      each interchangeable power module of the plurality of different types of interchangeable power modules is removably located and secured within the power module bay, and
      each interchangeable power module of the plurality of different types of interchangeable power modules utilises a different method for generating the electric power.

2. The electric rail carriage power system according to claim 1, wherein each interchangeable power module of the plurality of different types of interchangeable power modules is selected from the group comprising:

a liquid fuel engine power module; and
a fuel cell power module.

3. The electric rail carriage power system according to claim 2, wherein the liquid fuel engine power module comprises:
a liquid fuel engine;
an electric generator coupled to the engine by a transmission such that it can be driven by the liquid fuel engine, the electric generator arranged to generate electric power for supplying to the electric motor; and,
a fuel inlet for the liquid fuel engine having a fuel coupling to which a fuel line can be detachably coupled.

4. The electric rail carriage power system according to claim 3, wherein the liquid fuel engine power module comprises a diesel engine.

5. The electric rail carriage power system according to claim 3, wherein the liquid fuel engine power module further comprises an AC-DC converter electrically connected between the electric generator and the electric outlet.

6. The electric rail carriage power system according to claim 3, further comprising a control unit housed for controlling each interchangeable power module of the plurality of different types of interchangeable power modules; and
a control input having a control input coupling to which a control cable can be detachably coupled.

7. The electric rail carriage power system according to claim 1, wherein each interchangeable power module of the plurality of different types interchangeable power modules comprises a main structural support frame.

8. The electric rail carriage power system according to claim 1, further comprising a securing mechanism which is operable between a released configuration and a securing configuration in which it secures each interchangeable power module of the plurality of different types of interchangeable power modules within the power module bay.

9. The electric rail carriage power system according to claim 8, wherein the securing mechanism comprises at least one clamping element which, with the securing mechanism in the securing configuration, the clamping element acts against a part of the interchangeable power module.

10. The electric rail carriage power system according to claim 9, wherein each clamping element is rotatable between at least a released position and a securing position in which it acts against a part of each interchangeable power module of the plurality of different types of interchangeable power modules.

11. An electric rail carriage power system comprising:
a power module bay located only underneath a main chassis of an electric rail carriage;
a plurality of interchangeable power modules configured to generate electric power to power an electric motor;
an arrangement for supplying the electric power to the electric motor; and
a rechargeable power supply removably located and secured within the power module bay, wherein
each interchangeable power module of the plurality of interchangeable power modules is removably located and secured within the power module bay, and
each interchangeable power module of the plurality of interchangeable power modules utilises different methods for generating the electric power.

12. The electric rail carriage power system according to claim 11, wherein the interchangeable power module is selected from the group comprising:
a liquid fuel engine power module; and
a fuel cell power module.

13. The electric rail carriage power system according to claim 12, in which the liquid fuel engine power module comprises:
a liquid fuel engine;
an electric generator coupled to the engine by a transmission such that it can be driven by the liquid fuel engine, the electric generator arranged to generate electric power for supplying to the electric motor; and,
a fuel inlet for the liquid fuel engine having a fuel coupling to which a fuel line can be detachably coupled.

14. The electric rail carriage power system according to claim 13, wherein the liquid fuel engine power module is a diesel engine.

15. The electric rail carriage power system according to claim 13, wherein the liquid fuel engine power module further comprises an AC-DC converter electrically connected between the electric generator and an electric outlet.

16. The electric rail carriage power system according to claim 12, further comprising:
a control unit for controlling the power module; and
a control input having a control input coupling to which a control cable can be detachably coupled.

17. The electric rail carriage power system according to claim 11, wherein the interchangeable power module comprises a main structural support frame.

18. A method of providing an electric rail carriage power system, the method comprising the steps of:
providing an electric rail carriage comprising:
a power module bay located only underneath a main chassis of the electric rail carriage;
a plurality of wheels;
an electric motor driving at least one of the plurality of wheels;
a plurality of different types of interchangeable power modules, each interchangeable power module of the plurality of different types of interchangeable power modules being configured to generate electric power to power the electric motor;
an arrangement for supplying the electric power to the electric motor; and
a rechargeable power supply removably located and secured within the power module bay, wherein
each interchangeable power module of the plurality of different types of interchangeable power modules is removably located and secured within the power module bay, and each interchangeable power module of the plurality of different types of interchangeable power modules utilises different methods for generating the electric power;
selecting a first interchangeable power module from the plurality of different types of interchangeable power modules; and,
removably locating the first interchangeable power module within the at least one power module bay.

19. The method according to claim 18, comprising the steps of:
removing the first interchangeable power module from the at least one power module bay; and,
replacing the first interchangeable power module with a second interchangeable power module from the plurality of different types of interchangeable power modules.

20. The method according to claim 19, in which the second interchangeable power module is a different type of interchangeable power module from the first interchangeable power module.

* * * * *